United States Patent [19]

Yamamoto et al.

[11] Patent Number: 5,753,191
[45] Date of Patent: May 19, 1998

[54] GAS DISTRIBUTOR PLATE FOR A GAS PHASE POLYMERIZATION APPARATUS

[75] Inventors: Ryoichi Yamamoto; Takao Uetake; Satoru Ohtani; Yoshiaki Kikuchi; Kenji Doi, all of Yamaguchi-ken, Japan

[73] Assignee: Mitsui Chemicals, Inc., Tokyo, Japan

[21] Appl. No.: 578,998

[22] Filed: Dec. 27, 1995

[30] Foreign Application Priority Data

Dec. 28, 1994 [JP] Japan ................................. 6-327099
Jan. 12, 1995 [JP] Japan ................................. 7-003452
Nov. 20, 1995 [JP] Japan ................................. 7-301342

[51] Int. Cl.$^6$ ............................................. B01J 8/18
[52] U.S. Cl. ........................................ 422/143; 422/311
[58] Field of Search ............................ 422/131, 135, 422/139, 143, 311

[56] References Cited

U.S. PATENT DOCUMENTS

| | | | |
|---|---|---|---|
| 2,602,647 | 3/1952 | Miller. | |
| 3,982,900 | 9/1976 | Malgarini et al.. | |
| 4,518,750 | 5/1985 | Govoni et al. | 526/68 |
| 4,521,378 | 6/1985 | Ichimura et al. | 422/135 |
| 4,968,492 | 11/1990 | Delebarre et al. | 422/311 |
| 5,026,269 | 6/1991 | Ruotru | 431/7 |
| 5,161,315 | 11/1992 | Long | 34/57 A |
| 5,380,494 | 1/1995 | Ogawa et al. | 422/131 |
| 5,381,827 | 1/1995 | Koura et al. | 137/561 A |

FOREIGN PATENT DOCUMENTS

| | | |
|---|---|---|
| 2 274 345 | 1/1976 | France. |
| 2 271 727 | 4/1994 | United Kingdom. |

*Primary Examiner*—Christopher Kim
*Attorney, Agent, or Firm*—Birch, Stewart, Kolasch & Birch, LLP

[57] ABSTRACT

A gas distributor plate provided in a fluidized bed polymerization vessel which effects the gas phase polymerization of olefins, the gas distributor plate exhibiting excellent action for uniformly diffusing the gas flow in the fluidized bed zone. A gas distributor plate has a number of gas passage holes and is provided in a fluidized bed polymerization vessel which effects the gas phase polymerization of olefins, wherein when the inner radius of the straight drum portion of the polymerization vessel is denoted by 1, the holes perforated in the outer peripheral portion of the distributor plate at 0.7 to 1.0 from the center of the straight drum portion have an average diameter which is larger than the average diameter of the holes perforated in the inner peripheral portion of the distributor plate at smaller than 0.7 from said center. This makes it possible to uniformly and stably diffuse the gas flow in the fluidized bed zone in the polymerization vessel, to effectively prevent the formation of a dead zone, as well as to effectively prevent the polymer from adhering onto the wall surfaces of the polymerization vessel.

18 Claims, 6 Drawing Sheets

GAS DISTRIBUTOR PLATE FOR A GAS PHASE POLYMERIZATION APPARATUS

BACKGROUND OF THE INVENTION

1. (Field of the Invention)

The present invention is concerned with a gas distributor plate provided in a fluidized bed polymerization vessel which carries out the gas phase polymerization of olefins.

The words "polymerization" and "polymer" appearing in this specification are used in a sense to include "homopolymerization" and "copolymerization", as well as "homopolymer" and "copolymer".

2. (Prior Art)

Owing to the improvement in the transition metal catalysts for polymerizing olefins, the production of olefin polymers has increased strikingly per a unit amount of the transition metal and made it possible to eliminate the step for removing catalyst after the polymerization.

When such highly active catalysts are used, it is generally a widely accepted practice to conduct the polymerization of olefins in the gas phase since it requires the simplest polymerization operation. In such a gas phase polymerization, a fluidized bed polymerization vessel equipped with a gas distributor plate is used in many cases in order to smoothly carry out the polymerization. That is, an olefin or an olefin-containing gas is introduced into the lower portion of the polymerization vessel by using a compressor or a blower through a conduit, is caused to rise in the polymerization vessel being uniformly dispersed through a gas distributor plate in which a number of holes are perforated, and is subjected to the polymerization in a fluidized manner as it comes into contact with the catalyst particles in a fluidized bed zone on the upper side of the gas distributor plate. In this case, an olefin polymer is formed on the surfaces of the catalyst particles and, hence, solid particles comprising catalyst particles and olefin polymer float in the fluidized bed zone.

The unreacted gas is taken out from the upper part of the polymerization vessel, cooled with the cooling water or brine, and is sent to the lower part of the polymerization vessel by the compressor or blower so as to be used in a recycling manner.

In order to stably and efficiently operate the fluidized bed polymerization vessel to conduct the above-mentioned gas phase polymerization for extended periods of time, it becomes necessary to take the following countermeasures:

(1) To prevent the occurrence of heat spots in the fluidized bed which is the reaction zone for the gas phase polymerization;

(2) To prevent the polymer particles from melt-adhering in the fluidized bed; and (3) To prevent the formation of non-fluidizing or poorly fluidizing polymer particles.

As a principal means for carrying out these countermeasures, there can be proposed a method of uniformalizing the diffusion of gas in the fluidized bed zone, and a gas distributor plate plays an important role for uniformalizing the diffusion of gas.

For instance, the unreacted gas taken out from the upper part of the polymerization vessel includes a powdery polymer which contains catalyst. When the above-mentioned countermeasures (1) to (3) are not enough, the powdery polymer grows gradually due to polymerization or melt-adhesion as the powdery polymer is circulated, resulting in the formation of the polymer in the form of particles or masses. The powdery polymer and the granular or massive polymer adhere on the wall surfaces of the conduits to plug the conduits or to deteriorate the ability of the apparatus. In the fluidized bed zone in the polymerization apparatus, furthermore, the powdery polymer falls, passes through the holes in the distributor plate, blown back to the back surface of the distributor plate due to the flow of gas from the lower direction and builds up gradually. As a result, the polymer built up on the back surface of the distributor plate plugs the holes (gas passage holes) in the diffusion plate, or the polymer that is adhered peels to plug the holes of the distributor plate, making it difficult to feed the gas in a specified amount into the fluidized bed zone, or it becomes difficult to take out the massive polymer formed on the plugged portions in the polymerization apparatus.

Under such circumstances, a variety of gas distributor plates have heretofore been proposed.

Japanese Patent Publication No. 43443/1987 discloses a gas distributor plate having a numerical aperture lying within a predetermined range. By using this gas distributor plate, the flow of gas is stably maintained in the fluidized bed zone and the conduits are prevented from being plugged even when the unreacted gas taken out from the upper part of the polymerization vessel is circulated.

Japanese Patent Publication No. 42404/1992 discloses a gas distributor plate of a structure in which overcaps of the shape of a roof are provided on the gas passage holes, and the gas flows out from both sides of the caps.

Furthermore, Japanese Laid-Open Patent Publication No. 284509/1989 discloses a gas distributor plate having overcaps of the shape of which the outer line as viewed on a vertical cross section rises in an inclined manner so as to cover the gas passage holes, instead of having the above-mentioned roof-shaped overcaps.

The gas distributor plates having these overcaps exhibit excellent performance in preventing the gas passage holes from being plugged.

The gas distributor plates proposed in the above-mentioned prior art are helpful to some extent in preventing the gas passage holes from being plugged but are not still satisfactory from the standpoint of efficiently operating the fluidized bed polymerization vessel for extended periods of time. That is, the gas distributor plates of these prior art have poor action for uniformly diffusing the flow of gas in the fluidized bed zone, are not capable of removing the causes of plugging, and are not satisfactory for executing the above-mentioned countermeasures (1) to (3). Therefore, these gas distributor plates have limit on the effect for preventing the plugging and make it difficult to stably operate the polymerization vessel over extended periods of time.

SUMMARY OF THE INVENTION

It is therefore an object of the present invention to provide a gas distributor plate which is provided in a fluidized bed polymerization vessel which effects the gas phase polymerization of olefins, the gas distributor plate exhibiting excellent action for uniformly diffusing the flow of gas in the fluidized bed zone.

Another object of the present invention is to provide a gas distributor plate which effectively prevents the gas passage holes from being plugged.

According to the present invention, there is provided a gas distributor plate having a number of gas passage holes which is provided in a fluidized bed polymerization vessel which effects the gas phase polymerization of olefins, wherein when an inner radius of a straight drum portion of the polymerization vessel is denoted by 1, the holes perforated in an outer peripheral portion of the distributor plate at 0.7 to 1.0 from the center of the straight drum portion have an average diameter which is larger than the average diameter of the holes perforated in an inner peripheral portion of the distributor plate at smaller than 0.7 from said center.

In a conventional fluidized bed polymerization vessel, the velocity of gas flow in a portion close to the walls of the polymerization vessel is smaller than the velocity of gas flow at the central portion, preventing the gas from being uniformly diffused. Accordingly, a dead zone where masses of polymer easily grow is formed on the gas distributor plate or in the fluidized bed zone over the gas distributor plate, making it difficult to continuously operate the polymerization vessel for extended periods of time.

According to the gas distributor plate of the present invention, the gas passage holes perforated in the outer peripheral portion have an average diameter larger than that of the gas passage holes perforated in the inner peripheral portion, so that the velocity of gas flow through the gas passage holes formed in the outer peripheral portion becomes larger than the velocity of gas flow through the gas passage holes formed in the inner peripheral portion. Therefore, the velocity of gas flow as a whole becomes uniform in the fluidized bed zone, and dead zone is effectively prevented from being formed.

Furthermore, according to the present invention, the velocity of gas flow becomes considerably great near the wall of the vessel in the fluidized bed zone, and the polymer adheres on the walls of the polymerization vessel in decreased amounts.

According to the present invention, therefore, the gas distributor plate and the like are plugged very little, making it possible to operate the polymerization vessel continuously, stably and efficiently over extended periods of time.

According to the present invention, furthermore, there is provided a gas distributor plate having a number of gas passage holes which is provided in a fluidized bed polymerization vessel which effects the gas phase polymerization of olefins, wherein each hole is downwardly flaring in a conical shape at a flaring angle θ of from 60° to 150°.

In the gas distributor plate of this embodiment, the hole has an edge of an obtuse angle. Therefore, the powdery or massive polymer smoothly passes through the hole without being captured. Besides, since the sectional area of the hole decreases in a direction in which the gas flows, the velocity of gas flow passing through the hole increases to develop vortex, permitting the polymer to adhere in decreased amounts on the walls of the holes. Moreover, since the direction of gas flow changes along the wall surface of the hole, the direction of flow of the powdery polymer contained in the gas flow undergoes a change, so that the polymer adheres in decreased amounts even in this respect.

According to the present invention, there is further provided a gas distributor plate having a number of gas passage holes which is provided in a fluidized bed polymerization vessel which effects the gas phase polymerization of olefins, wherein an overcap is so provided as to cover the upper side of each hole so that the gas flowing through said hole is drained in one direction, an outer line of the cap as viewed in a vertical cross section upwardly rises in an inclined manner from a root portion thereof toward the hole in a straight shape or in a stream lined shape, and an upper end thereof is formed horizontally.

The gas distributor plate with overcaps disclosed in the above-mentioned Japanese Patent Publication No. 42404/1992 and Japanese Laid-Open Patent Publication No. 284509/1989 have an advantage in that the powdery or massive polymer falling from the fluidized bed zone does not easily enter into the gas passage holes. However, the polymer that happens to enter into the overcaps stay therein and plugs the caps, still leaving room for improvement. Moreover, these gas distributor plates are not satisfactory even from the standpoint of uniformly diffusing the flow of gas.

According to the gas distributor plate equipped with overcaps having a horizontal portion of the present invention, on the other hand, the gas that has passed through the gas passage holes flows out horizontally along the upper surface of the gas distributor plate. Therefore, the powdery or massive polymer that happens to fall down from the fluidized bed zone, is permitted to enter little into the caps. Besides, the gas flows smoothly in a horizontal direction from the rising portion of the cap to the horizontal portion thereof. Therefore, the velocity of gas flow is nearly uniformalized in the cap space and, hence, dead zone is little formed in the cap space. Accordingly, the gas distributor plate having such overcaps of the present invention effectively prevents the plugging not only in the gas passage holes but also in the caps.

Besides, according to the present invention, there is further provided a gas distributor plate having a number of gas passage holes which is provided in a fluidized bed polymerization vessel which effects the gas phase polymerization of olefins, wherein an overcap is so provided as to cover an upper side of each hole so that the gas flowing through said hole is drained in one direction, an outer line of the cap as viewed in a vertical cross section is upwardly inclined from a root portion thereof toward the hole in a straight shape or in a stream lined shape, and a partitioning wall is provided in a portion in the cap on the side opposite to the side where the gas flows out, the partitioning wall rising from an upper edge of the hole and reaching an inner wall surface of the cap.

Being provided with the partitioning wall, the gas distributor plate prevents the formation of dead zone where the gas flow tends to stagnate and, hence, effectively prevents the plugging in the caps. That is, in an overcap which is so formed that the gas flow is drained in one direction, a dead zone is likely to be formed in space between the upper edge of the gas passage hole and the inner wall of the cap at a portion (hereinafter referred to as "back side") on the side opposite to the side where the gas flows out in the cap. According to the embodiment of the present invention, the partitioning wall that rises from the upper edge of the gas passage hole prevents the formation of dead zone.

In the gas distributor plate equipped with overcaps of the present invention, therefore, the partitioning wall is formed and, as described earlier, a horizontal portion is formed at the upper end of the caps, in order to more effectively prevent the formation of dead zone and to prevent the plugging in the overcaps.

DETAILED DESCRIPTION OF THE INVENTION

The invention will now be described by way of embodiments in conjunction with the accompanying drawings.
(Polymerization Vessel)

Figure 1:
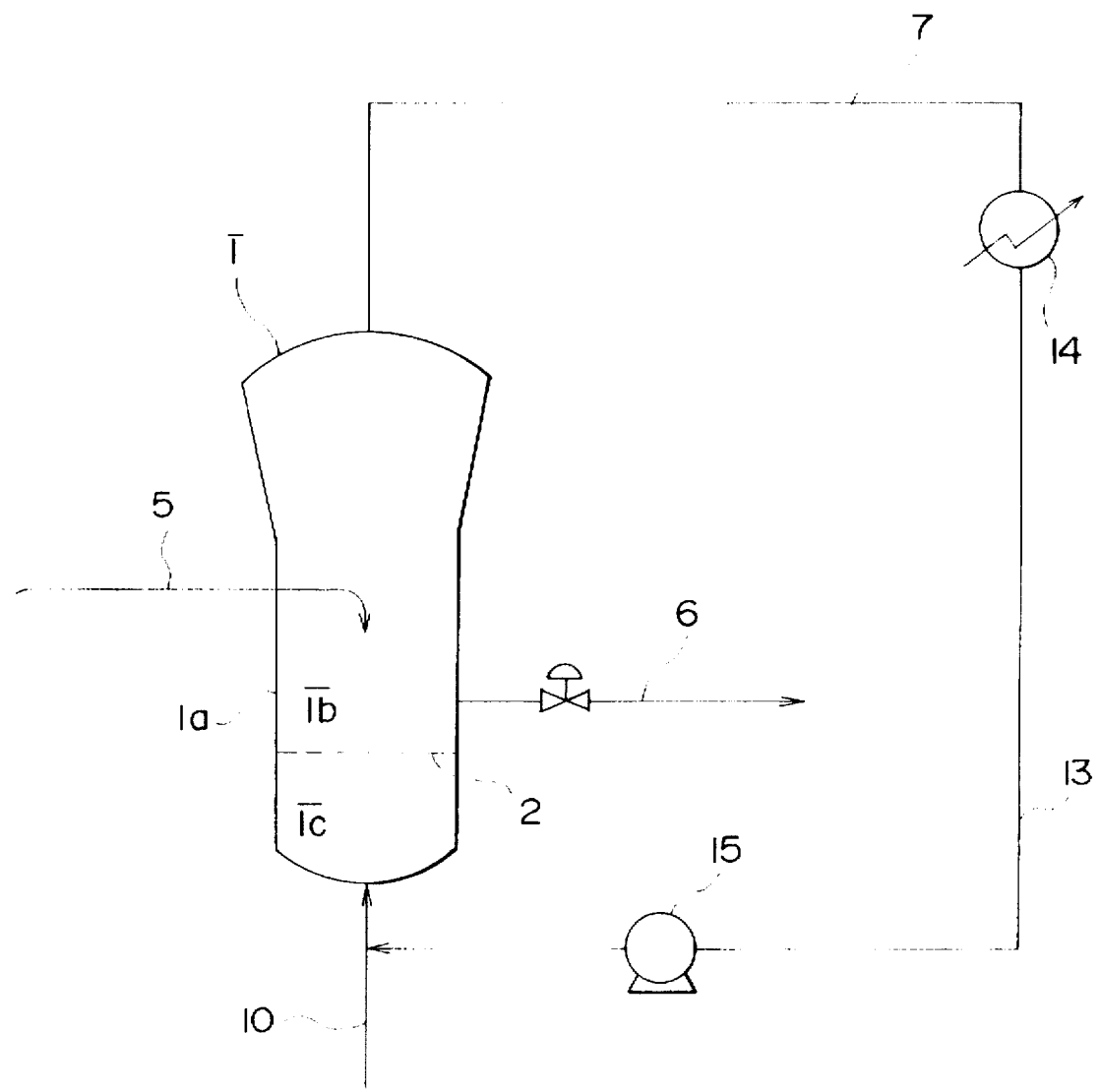
FIG. 1 is a diagram simply illustrating the structure of a fluidized bed polymerization vessel equipped with a gas distributor plate of the present invention.

Referring to FIG. 1 simply illustrating the structure of a fluidized bed polymerization vessel equipped with a gas distributor plate of the present invention, a polymerization vessel 1 has a straight drum portion 1a. A gas distributor plate 2 is provided at a lower portion of the straight drum portion 1a, space in the polymerization vessel 1 is divided up and down by the gas distributor plate 2, a fluidized bed zone 1b is formed in an upper side of the plate 2 to effect gas phase polymerization, and a gas introduction zone 1c is formed in a lower side of the plate 2.

A conduit 5 for feeding a catalyst and a conduit 6 for taking out the formed polymer are connected to the fluidized bed zone 1b in the polymerization vessel 1, and a gas exhaust pipe 7 is connected to an upper portion.

To the gas introduction zone 1c is connected a pipe 10 for feeding an olefin or a gas containing olefin. The gas introduced into the gas introduction zone 1c flows into the fluidized bed zone 1b through the gas distributor plate 2, and is subjected to the gas phase polymerization in a fluidized manner.

The exhaust gas from the gas exhaust pipe 7 is circulated into the gas introduction zone 1c passing through a cooler 14, a blower (or compressor) 15 and a circulation conduit 13. The gas circulated through the circulation conduit 13 contains the powdery polymer though the amount may be very small.

(Gas Passage Holes in the Gas Distributor Plate)

Figure 2:
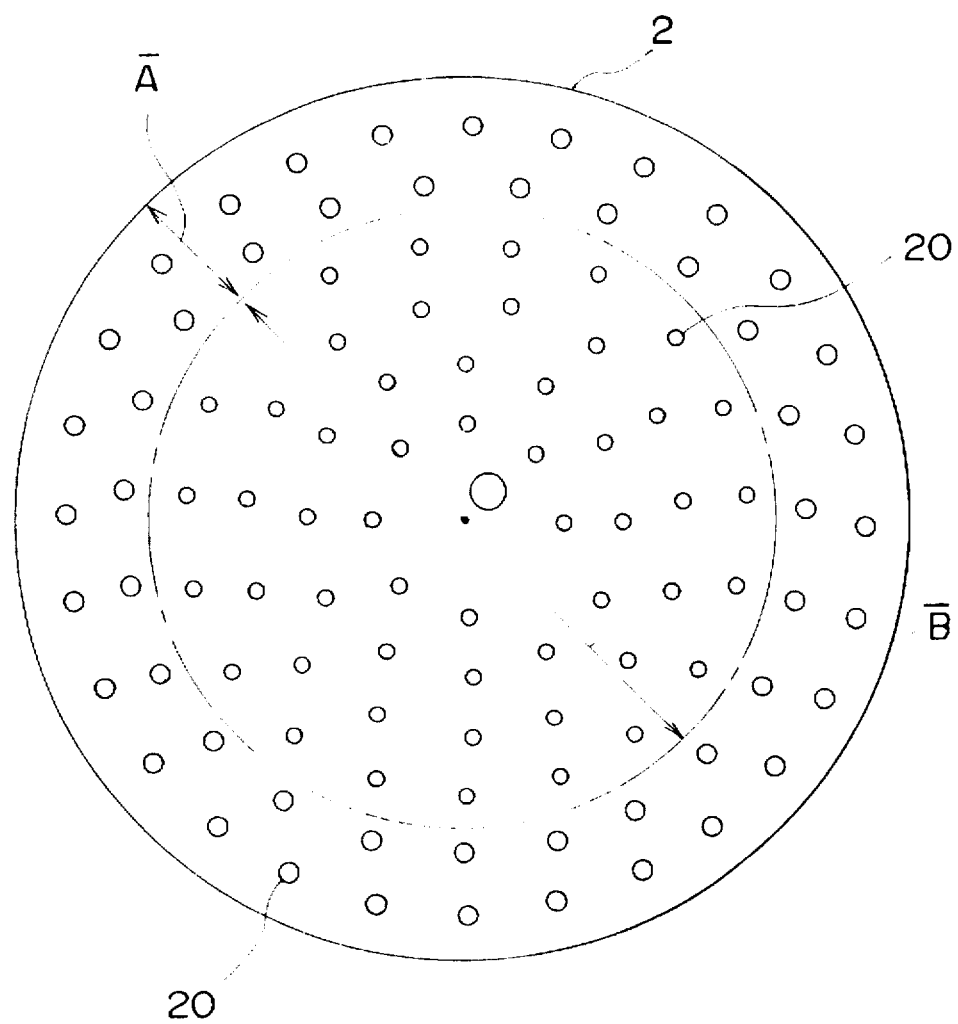
FIG. 2 is a plan view of the gas distributor plate of the present invention.

Referring to FIG. 2 which is a plan view of the gas distributor plate of the present invention used for the above-mentioned fluidized bed polymerization vessel 1, a number of gas passage holes 20 are formed in the gas distributor plate 2, and the gas flows into the fluidized bed zone 1b from the gas introduction zone 1c passing through the passage holes 20.

According to the present invention, when the inner radius of the straight drum portion 1a of the polymerization vessel 1 is denoted by 1, the holes 20 perforated in the outer peripheral portion A of the distributor plate at 0.7 to 1.0 from the center O of the straight drum portion (which is in common with the center O of the distributor plate 2) have an average diameter which is larger than the average diameter of the holes 20 perforated in the inner peripheral portion B of the distributor plate at smaller than 0.7 from said center O.

Accordingly, the velocity of gas flowing through the holes 20 in the outer peripheral portion A close to the wall surface of the polymerization vessel 1 becomes greater than the velocity of gas flowing through the holes 20 in the inner peripheral portion B. Therefore, even when the velocity of gas flow decreases due to friction with the wall surface of the polymerization vessel 1, the gas flow as a whole is uniform in the fluidized bed zone 1b, and no variance develops in the flow velocity. Hence, there is formed no dead zone where there tends to stay powdery polymer or polymer grown into masses. Besides, the occurrence of heat spots which are causes of irregular polymerization is effectively prevented. In the fluidized bed zone 1b, furthermore, the velocity of gas flow is fast in the portions close to the wall surface of the polymerization vessel 1, and the polymer is effectively prevented from adhering onto the wall surfaces.

In the above-mentioned gas distributor plate 2, there is no particular limitation on the average diameter of holes formed in the outer peripheral portion A, which is larger than the average diameter of holes formed in the inner peripheral portion B. For example, part of the holes 20 formed in the outer peripheral portion A may have diameters smaller than the average diameter of the holes formed in the inner peripheral portion B, or the diameter of the hole may be gradually increased from the center O toward the outer peripheral portion A. It is generally desired that the holes formed in the outer peripheral portion A have such an average diameter that the average linear velocity of gas passing through the holes 20 in the outer peripheral portion A is 20 to 100 times as fast and, particularly, 30 to 70 times as fast as the linear velocity of gas in the fluidized bed zone 1b. Concretely speaking, it is desired that the holes formed in the outer peripheral portion A has an average diameter which is 1.1 to 5 times as great and, particularly, 1.5 to 3 times as great as the average diameter of the holes formed in the inner peripheral portion B. A too large difference between these two average diameters rather impair uniformity in the diffusion of gas. In this case, the linear velocity of gas passing through the holes 20 formed in the outer peripheral portion A is calculated from a pressure difference between the fluidized bed zone 1b and the gas introduction zone 1c, from the rate of supplying the gas and from the diameters of the holes 20.

As will be described later, furthermore, when the gas passage holes 20 have diameters that become smaller toward the fluidized bed zone 1b and become larger toward the gas introduction zone 1c, the diameters of the gas passage holes 20 stand for the minimum diameters (i.e., diameters on the side of the fluidized bed zone 1b).

Generally, a number of gas passage holes 20 in the gas distributor plate 2 should be arranged circularly and concentrically. In general, furthermore, the diameters and densities of holes on the side of the fluidized bed zone 1b should be from 10 to 18 mm and from 150 to 500 holes/m$^2$ though they may vary depending upon the outer peripheral portion A and the inner peripheral portion B, and it is desired to set the average hole diameters in the outer peripheral portion A and in the inner peripheral portion B within the above-mentioned ranges so as to satisfy the above-mentioned conditions.

Figure 3:
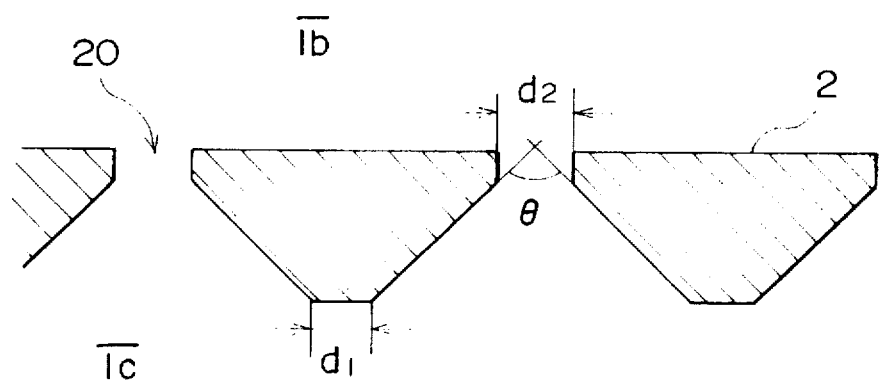
FIG. 3 is a side sectional view illustrating, on an enlarged scale, the gas passage holes in the gas distributor plate of the present invention.
Figure 4:
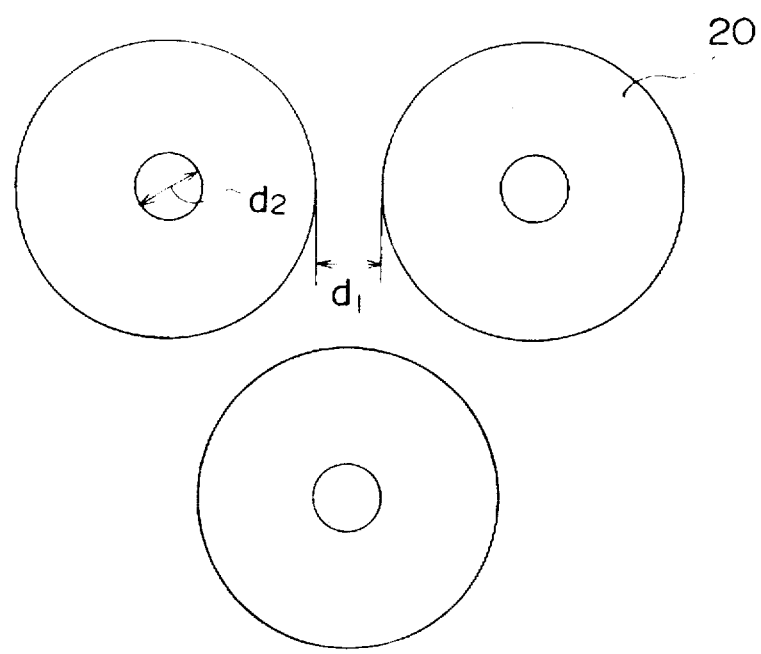
FIG. 4 is a plan view illustrating the gas passage holes of FIG. 3 on an enlarged scale.

FIGS. 3 and 4 illustrate a preferred shape of gas passage holes 20 formed in the gas distributor plate 2 of the present invention. FIG. 3 is a side sectional view illustrating gas passage holes 20 on an enlarged scale, and FIG. 4 is a plan view of the gas passage holes 20 of FIG. 3 on an enlarged scale.

In this case, as shown in FIGS. 3 and 4, the gas passage holes 20 are formed conically flaring downwardly (toward the side of the gas introduction zone 1c).

Figure 5:
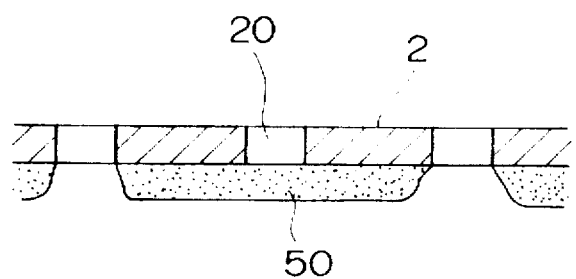
FIG. 5 is a diagram illustrating a state where the gas passage holes are plugged in a conventional gas distributor plate.
Figure 6:
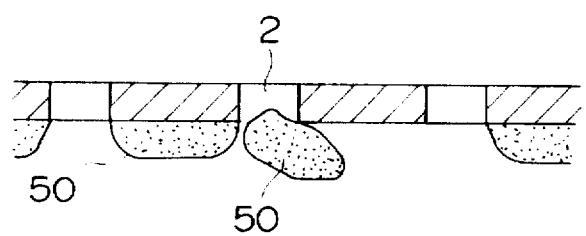
FIG. 6 is a diagram illustrating another state where the gas passage holes are plugged in the conventional gas distributor plate.

Reference should be made to FIGS. 5 and 6 illustrating a state where the gas passage holes 20 are plugged as would happen generally. As described earlier, the gas circulated into the polymerization vessel 1 contains the powdery polymer and contains, depending upon the cases, the masses of polymer formed by the growth of powdery polymer or as the polymer adhered on the vessel walls peels off. As the gas is blown onto the back surface of the gas distributor plate 2 in the gas introduction zone 1c, these polymer adhere onto the back surface as shown in FIGS. 5 and 6 and build up gradually (in the drawings, the adhered polymer is designated at 50). That is, as the polymer adheres to the back surface to an extreme degree, the gas passage holes 20 are completely plugged as shown in FIG. 5, or the polymer peels off the back surface as shown in FIG. 6 and plugs the gas passage hole 20. As a result, the gas is not supplied in a predetermined amount into the fluidized bed zone 1b, or the velocity of gas flow undergoes variation in the fluidized bed zone 1b to impair stable operation in the polymerization vessel 1.

As shown in FIGS. 3 and 4, however, the gas passage holes 20 which are downwardly flaring are very little plugged unlike those of FIG. 5. Besides, even when the polymer adhered to the back surface of the distributor plate 2 peels off, the peeled masses of polymer are little trapped in the gas passage holes 20; i.e., the gas passage holes 20 are effectively prevented from being plugged unlike those of FIG. 6. In the embodiment of FIGS. 3 and 4, furthermore, the velocity of gas flowing through the gas passage holes 20 increases due to their shape giving rise to the occurrence of vortex. Moreover, since the direction of gas flow changes along the wall surface in the hole 20, the powdery polymer contained in the gas adheres very little onto the wall surfaces.

In the present invention, it is desired that the gas passage holes 20 have a flaring angle θ of from 60° to 150° and, particularly, from 90° to 120°. When this angle is too small, the effect for preventing the plugging becomes insufficient. When the angle is too large, the diameter $d_2$ at the upper end of the gas passage holes 20 becomes considerably small or the diameter at the lower end becomes very large, causing the distributor plate to contain only a decreased number of gas passage holes 20. As a result, it becomes difficult to sufficiently increase the velocity of gas flow in the fluidized bed zone 1b, or the loss of pressure so increases that the blower 15 having a very large output must be employed. There further arises another disadvantage that the gas distributor plate 2 must have a very increased thickness.

It is further desired that the gap $d_1$ among the neighboring holes 20 on the side of the lower end and the diameter $d_2$ of the holes 20 on the side of the upper end satisfy a relationship $d_1 < d_2$. This relationship is every effective in preventing the holes 20 from being plugged in a way as shown in FIG. 6. That is, with the gap $d_1$ being set to be smaller than the diameter $d_2$, the masses of polymer that peeled off smoothly pass through the gas passage holes 20 without being trapped therein.

The gas passage holes 20 formed in a shape as shown in FIGS. 3 and 4 make it possible to effectively prevent the plugging. By satisfying the conditions of the hole diameter in the outer peripheral portion A and the hole diameter in the inner peripheral portion B as described in relation to FIG. 1, furthermore, it is allowed to very uniformly diffuse the gas flow in the fluidized bed zone 1c making it very advantageous to continuously and stably carry out the polymerization in the polymerization vessel 1.

(Overcaps on the Gas Distributor Plate)

According to the present invention, furthermore, it is desired to provide overcaps on the gas passage holes 20 of the gas distributor plate 2. That is, provision of overcaps makes it possible to effectively prevent the powdery polymer that falls from the fluidized layer zone 1b from entering into the gas passage holes 20.

Figure 7:
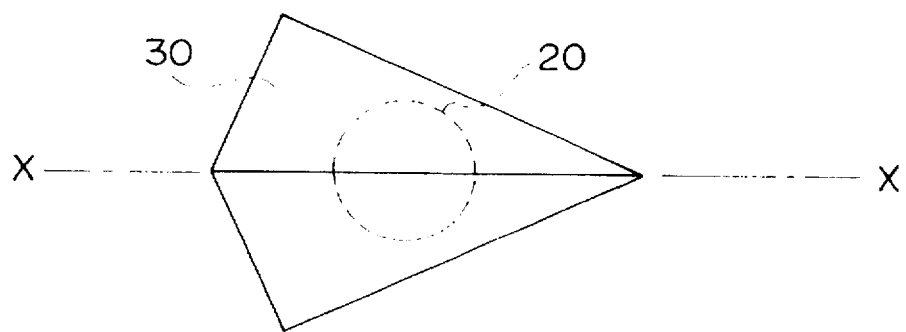
FIG. 7 is a plan view of an overcap provided on the gas passage hole.
Figure 8:
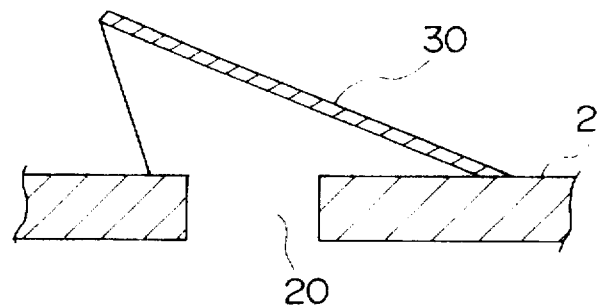
FIG. 8 is a diagram illustrating the X—X section of the overcap of FIG. 7, the gas passage hole being formed in a straight shape.
Figure 9:
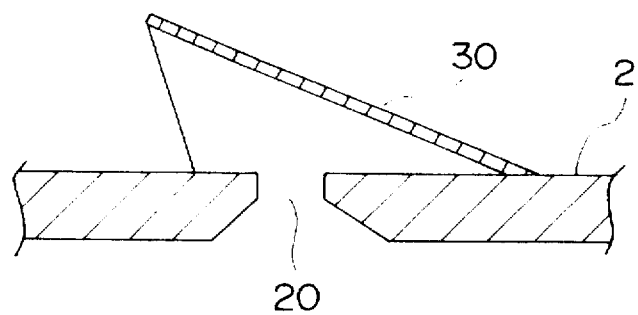
FIG. 9 is a diagram illustrating the X—X section of the overcap of FIG. 7, the gas passage hole having the shape of FIG. 3.

FIGS. 7 to 9 illustrate an example of the overcaps provided on the gas distributor plate. FIG. 7 is a plan view of the overcap, FIGS. 8 and 9 are diagrams illustrating in vertical cross section (X—X section in FIG. 7) the overcap of FIG. 7 together with the gas passage hole, and, particularly, FIG. 8 illustrates the case where the gas passage hole is formed straight and FIG. 9 illustrates the case where the gas passage hole 20 is formed downwardly flaring as shown in FIG. 3.

In these drawings, the overcap designated at 30 as a whole has the shape of a roof. As shown in FIGS. 8 and 9, in particular, the overcap has an outer line which, as viewed in a vertical cross section, is upwardly inclined straight from the root portion thereof and covers the upper portion of the hole 20. Therefore, the gas that has passed through the hole 20 flows in one direction along the wall surface of the overcap 30.

In this case, as will be comprehended from the plan view of FIG. 7, the wall surface of the overcap 30 should be broadened (e.g., in a V-shape) toward the side in which the gas flows out to let the gas smoothly flow out without stagnation.

In FIGS. 8 and 9, the overcap 30 has a straight outer line but may have a streamlined shape.

As shown in FIG. 2, the gas passage holes 20 are usually arranged circularly and concentrically. Here, it is desired that the overcaps 30 are formed in the same direction along the concentric circles to create vortex streams. In particular, it is desired that the overcaps 30 on the gas passage holes 20 along the outermost circumference are slightly deviated outwardly (toward the wall surface of the polymerization vessel). By setting the directions of the overcaps 30 as described above, the gas flow is stabilized in the fluidized bed zone 1b, and the polymer is effectively prevented from adhering on the inner walls of the polymerization vessel.

In the present invention, furthermore, the outer line of the overcap 30 can be suitably changed so that the gas which has passed through the gas passage hole 20 flows along the upper surface of the gas distributor plate 2. This makes it possible to effectively prevent the powdery polymer falling from the fluidized bed zone 1b from entering into the overcaps 30. Thus, the overcaps 30 and the gas passage holes 20 are more effectively prevented from being plugged.

Figure 10:
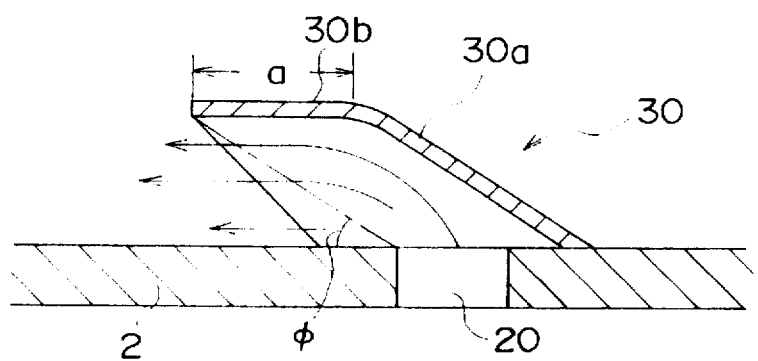
FIG. 10 is a vertical sectional view illustrating a preferred example of overcap provided on the gas passage hole.

A preferred example of the overcaps 30 is shown in FIG. 10.

Like FIGS. 8 and 9, FIG. 10 is a vertical sectional view of the overcap 30. As will be obvious from this diagram, a horizontal portion 30b is formed at the upper end of an inclined portion (which is usually straight or streamlined) on the outer line of the overcap 30.

With the horizontal portion 30b being formed, the gas that has passed through the gas passage hole 20 flows along the upper surface of the gas distributor plate 2, and the powdery polymer is effectively prevented from entering into the overcaps 30.

In this case, it is desired that the horizontal portion 30b has a length (a) which lies within a range of 3 mm≦a≦30 mm. When this length is too small, it is not allowed to effectively form the horizontal flow. When the length is too large, on the other hand, a dead zone tends to be formed inside the overcaps 30.

It is desired that the angle φ subtended by the upper surface of the gas distributor plate 2 and a straight line connecting the end of the horizontal portion 30b and the upper end on the outlet side of the gas passage hole 20, is smaller than 60° and, particularly, smaller than 45°. When this angle φ is too great, it becomes difficult to effectively form the horizontal flow.

In the overcap 30 shown in FIG. 10, furthermore, a dead zone may often be formed between the root portion of the inclined wall 30a of the overcap 30 and the upper back edge of the gas passage hole 20 (portion of the side opposite to the side where the gas flows out). According to the present invention, a suitable partitioning wall is provided to effectively prevent the formation of the dead zone.

Figure 11:
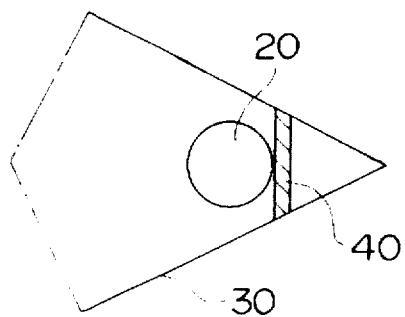
FIG. 11 is a plan view of an overcap having a partitioning wall.
Figure 12:
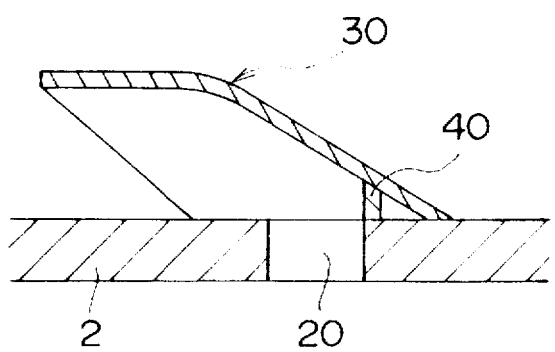
FIG. 12 is a vertical sectional view of the overcap.

An example of the partitioning wall is shown in FIGS. 11 and 12. FIG. 11 is a plan view schematically illustrating the overcap 30 with the partitioning wall, and FIG. 12 is a vertical sectional view of the overcap 30 of FIG. 11.

Referring to FIGS. 11 and 12, a flat plate-like partitioning wall 40 is provided standing upright to come into contact with the upper back side edge of the gas passage hole 20 and arriving at the wall surface of the inclined wall 30a of the overcap 30. The above-mentioned partitioning wall 40 completely shuts off the space between the root portion of the inclined wall 30a and the upper edge of the gas passage hole 20 where a dead zone is likely to be formed from the flow of gas. Therefore, adhesion or accumulation of polymer on this portion is effectively prevented.

Figure 13:
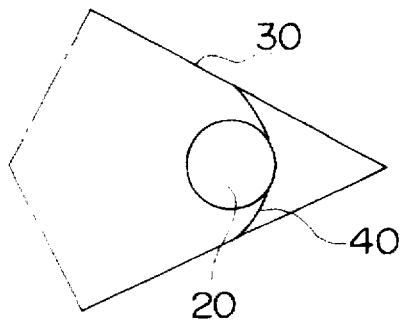
FIG. 13 is a plan view of an overcap having a suitable partitioning wall.
Figure 14:
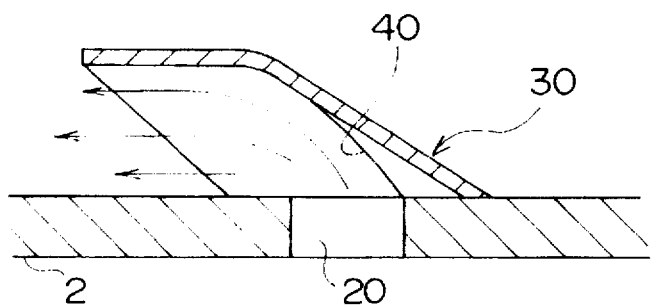
FIG. 14 is a vertical sectional view of the overcap of FIG. 13.

The partitioning wall shown in FIGS. 11 and 12 is of the shape of a flat plate, which, however, may be formed in the shape of a curved plate as shown in FIGS. 13 and 14. FIG. 13 corresponds to FIG. 11, and FIG. 14 corresponds to FIG. 12.

According to this embodiment as shown in FIGS. 13 and 14, it will be understood that the partitioning wall 40 is curved along the back side edge at the upper end of the gas passage hole 20 and is rising in an inclined manner so as to be smoothly joined to the inclined wall 30a. By curving the partitioning wall 40 as described above, the gas that has passed through the gas passage hole 20 is permitted to flow horizontally without stagnation, presenting great advantage in uniformalizing and stabilizing the velocity of gas flow.

In the embodiments shown in FIGS. 10 to 14, the gas passage holes 20 have a straight shape. It is, however, desired to form the gas passage holes 20 in a flaring shape as shown in FIG. 3 from the standpoint of preventing the plugging.

The partitioning walls 40 shown in FIGS. 11 to 14 can further be applied to the overcap shown in FIGS. 7 to 9.
(Polymerizing Conditions)

In the gas phase polymerization of olefins using the polymerization vessel 1 equipped with the above-mentioned gas distributor plate 2, examples of the olefins to be polymerized include ethylene, propylene, 1-butene, 1-pentene, 1-hexene, 1-octene, 1-decene, 4-methyl-1-pentene, 3-methyl-1-pentene, styrene, butadiene, isoprene, 1,4-hexadiene, dichyclopentadiene, 5-ethylidene-2-norbornene, and the like. They may be used in a single kind or in a combination over a range in which they can be subjected to the gas phase polymerization. Usually, the present invention can be preferably adapted to the homopolymerization of an ethylene or a propylene, and to the copolymerization of an ethylene or a propylene and other olefins.

A hydrogen gas may be used together with the above-mentioned olefins in order to adjust the molecular weight.

Though there is no particular limitation, it is desired that the catalyst contains a catalyst component of a transition metal compound. The catalyst component of the transition metal compound will be the compound of a transition metal such as titanium, vanadium, chromium, zirconium or the like, and will be in the form of a liquid or a solid depending upon the conditions in which it is used. The catalyst component needs not be a single compound but may be carried by other compounds, or may be in the form of a homogeneous mixture with other compounds, or may be in the form of a complex or a composite compound with other compounds.

Examples of the catalyst containing the catalyst component of such a transition metal compound include Ziegler-Natta catalyst and metallocene catalyst that have been widely known.

The Ziegler-Natta catalyst contains a titanium catalyst component as the catalyst component of transition metal compound and further contains the catalyst component of an organometal compound.

A desired titanium catalyst component is so highly active as to form an olefin polymer in an amount of not smaller than about 5000 g and, particularly, not smaller than about 8000 g per millimol of titanium. A representative example is a solid titanium catalyst component which is highly activated with a magnesium compound. The highly activated solid titanium catalyst component contains, for example, titanium, magnesium and halogen as essential components, contains amorphous magnesium halide, and has a specific surface area of preferably not smaller than 40 m²/g and, particularly, from 80 to 800 m²/g. The highly active titanium catalyst component may contain an electron donor such as organic ester, silicic ester, acid halide, acid anhydride, ketone, acid amide, tertiary amine, inorganic acid ester, phosphoric ester, phosphorous ester, ether or the like. A particularly preferred catalyst component contains titanium in an amount of from about 0.5 to about 10% by weight and, particularly, from about 1 to about 8% by weight, has a titanium/magnesium ratio (atomic ratio) of from about ½ to about 1/100 and, particularly, from about ⅓ to about 1/50, a halogen/titanium ratio (atomic ratio) of from about 4 to about 100 and, particularly, from about 6 to about 80, and an electron donor/titanium ratio (molar ratio) of from 0 to about 10 and, particularly, from 0 to about 6.

The catalyst component of an organometal compound used together with the above-mentioned titanium catalyst component has bonds of carbon atoms and metals of the Groups I to III of periodic table, such as an organic compound of an alkali metal, an organometal compound of an alkaline earth metal or an organoaluminum compound. Concrete examples include alkyl lithium, aryl sodium, alkyl magnesium, aryl magnesium, alkylmagnesium halide, arylmagnesium halide, alkylmagnesium hydride, trialkyl aluminum, alkylaluminum halide, alkylaluminum hydride, alkylaluminum alkoxide, alkyl lithium aluminum, and mixtures thereof.

In addition to the titanium catalyst component and the catalyst component of organometal compound, there can be further used halogenated hydrocarbons or the aforementioned electron donor in order to adjust the stereospecificity, molecular weight and molecular weight distribution. In this case, the electron donor component can be used in a form in which the catalyst component of an organometal compound and a complex or an adduct have been formed in advance.

In the above-mentioned Ziegler-Natta catalyst, it is desired that the titanium catalyst component is used in an amount of from about 0.0005 to about 1 millimol and, particularly, from about 0.001 to about 0.5 millimol in terms of a transition metal per liter of the reaction bed volume. It is further desired that the catalyst component of the organometal compound is used in such an amount that the organometal/transition metal ratio (atomic ratio) is from about 1 to about 2000 and, particularly, from about 1 to about 500. When an electron donor catalyst component is used in addition to the titanium catalyst component and the catalyst component of the organometal compound, it is desired that its amount is not larger than about 1 mol and, particularly, not larger than about 0.5 mols per mole of the catalyst component of the organometal compound.

As the metallocene catalyst, there can be used a solid metallocene catalyst comprising, for example, (a) a compound of a transition metal of the group IVB of periodic table including a ligand having a cyclopentadienyl skeleton, (b) an organoaluminum oxy compound, and (c) a particulate carrier.

In the solid metallocene catalyst, the transition metal compound (a) (hereinafter often referred to as metallocene compound (a)) is represented by the following formula (1), MLx                              (1)

wherein M denotes a transition metal atom of the Group IVB which, concretely, is zirconium, titanium or hafnium, and L denotes ligands coordinated on transition metal atoms, at least one ligand L having a cyclopentadienyl skeleton. Ligands L without cyclopentadienyl skeleton will be hydrocarbon group with 1 to 12 carbon atoms, alkoxy group, aryloxy group, trialkylsilyl group, $SO_3R$ group (R is a hydrocarbon group with 1 to 8 carbon atoms and may have a substituent such as halogen), halogen atom or hydrogen atom. Symbol x denotes a valence of the transition metal atom M.

In the ligands L without having the cyclopentadienyl skeleton, concrete examples of the hydrocarbon group having 1 to 12 carbon atoms include alkyl group, cycloalkyl group, aryl group and aralkyl group. Furthermore, examples of the alkyl group include methyl group, ethyl group, propyl group, isopropyl group and butyl group, examples of the cycloalkyl group include cyclopentyl group and cyclohexyl group, examples of the aryl group include phenyl group, tolyl group, and examples of the aralkyl group include benzyl group and neophyl group.

The metallocene compounds (a) represented by the above-mentioned formula (1) can be used in a single kind or in a combination of two or more kinds. They may further be used being diluted with hydrocarbons or halogenated hydrocarbons.

In the metallocene compounds (a) used in the present invention, it is desired that the transition metal atom at the center is zirconium and at least two ligands L have a cyclopentadienyl skeleton. Concrete examples include:
Bis(n-propylcyclopentadienyl)zirconium chloride;
Bis(n-butylcyclopentadienyl)zirconium chloride;
Bis(1-methyl-3-n-propylcyclopentadienyl)zirconium chloride;
Bis(1-methyl-3-n-butylcyclopentadienyl)zirconium chloride;
Bis(trimethylcyclopentadienyl)zirconium chloride;
Bis(tetramethylcyclopentadienyl)zirconium chloride;
Bis(pentamethylcyclopentadienyl)zirconium chloride;
Bis(hexylcyclopentadienyl)zirconium chloride; and
Bis(trimethylsilylcyclopentadienyl)zirconium chloride.

As the organoaluminum oxy compound (b), there can be exemplified a widely known aluminooxane obtained by oxidizing an organoaluminum compound and a benzene-insoluble aluminum oxy compound disclosed in Japanese Laid-Open Patent Publication No. 276807/1990.

The conventional aluminooxane can be prepared by, for example, the methods described below.

(i) A method in which an organoaluminum compound such as trialkylaluminum is added to a hydrocarbon medium in which are suspended compounds containing adsorption water or salts containing water of crystallization, such as hydrate of magnesium chloride, hydrate of copper sulfate, hydrate of aluminum sulfate, hydrate of nickel sulfate or hydrate of cerous chloride, and aluminooxane which is the reaction product is recovered as a solution of hydrocarbons.

(ii) A method in which the water (in the form of any one of liquid, solid or gas) is directly acted upon an organoaluminum compound such as trialkylaluminum in a medium such as benzene, toluene, ethyl ether or tetrahydrofurane, and aluminooxane which is the reaction product is recovered as a solution of the medium.

(iii) A method in which an organotin oxide such as dimethyltin oxide or dibutyltin oxide is reacted with an organic compound such as trialkylaluminum in a medium such as decane, benzene or toluene, and aluminooxane which is the reaction product is recovered as a solution of the medium.

The solution of the recovered aluminooxane can be directly used for preparing a solid metallocene catalyst, or may be dissolved again in a predetermined solvent after the solvent or the unreacted organoaluminum compound is removed therefrom by distillation or the like, in order to use it for the preparation of the catalyst.

The aluminooxane may contain small amounts of metal components other than aluminum.

It is desired that the organoaluminum oxy compound (b) is contained usually in an amount of from 5 to 1000 mols and, particularly, from 10 to 400 mols per mol of the solid metallocene catalyst (in terms of transition metal atoms).

Examples of the particulate carrier (c) include inorganic particles such as of $SiO_2$, $Al_2O_3$, MgO, $ZrO_2$, CaO, $TiO_2$, ZnO, $ZnO_2$, $SnO_2$, BaO, ThO, as well as resin particles such as of polyethylene, poly-4-methyl-1-pentene, styrene-divinyl benzene copolymer, etc., which may be used in a single kind or in a combination of two or more kinds.

The solid metallocene catalyst is prepared by a widely known method by using the above-mentioned metallocene compound (a), organoaluminum oxy compound (b) and particulate carrier (c). Usually, the metallocene compound (a) is used in an amount of from 0.001 to 1.0 millimol and, particularly, from 0.01 to 0.5 millimols (in terms of transition metal atoms), and the organoaluminum oxy compound (b) is used in an amount of from 0.1 to 100 millimols and, particularly, from 0.5 to 20 millimols per gram of the particulate carrier (c).

It is desired that the solid metallocene catalyst that is used has a particle diameter of from 1 to 300 μm and, particularly, from 10 to 100 μm.

Like the above-mentioned Ziegler-Natta catalyst, furthermore, the solid metallocene catalyst may, as required, contain other components such as electron donor and reaction assistant that are useful for the polymerization of olefins.

As a cocatalyst, furthermore, there may be used in combination an organoaluminum compound that is used for the Ziegler-Natta catalyst. The organoaluminum compound can be used as a starting material for producing the above-mentioned aluminooxane.

It is desired that the reaction temperature is lower than the melting point of the olefin polymer that is formed and, preferably, lower than the melting point by more than about 10° C., and is from room temperature to about 130° C. and, particularly, from about 40° to about 110° C.

The pressure for polymerization is usually set to be from atmospheric pressure to about 150 kg/cm² and, particularly, from about 2 to about 70 kg/cm².

During the polymerization, gaseous inert hydrocarbons such as propane or butane may be fed together with the olefin gas in order to remove the heat of polymerization.

EXAMPLES

The invention will now be described by way of Experiments.

(Experiments 1 to 12)

By using a fluidized bed polymerization vessel equipped with a gas distributor plate having gas passage holes and overcaps shown in Table 1 or 2, propylene and a small amount of ethylene were subjected to the gas phase polymerization under the following conditions to prepare a polypropylene.

Superficial gas velocity in a column: 60 cm/sec
Polymerization pressure: 12 kg/cm² G
Polymerization temperature: 70° C.
Residence time: one hour In conducting the above-mentioned gas phase polymerization, continuous operation in the polymerization vessel was evaluated, and the adhesion of polymer on the polymerization vessel and on the gas distributor plate was observed. The results will be described later.

In conducting the gas phase polymerization, furthermore, the average velocity u of gas flow passing through the gas passage holes in the outer peripheral portion A of the gas distributor plate was calculated from the rate of feeding the gas, diameters of gas passage holes, and a pressure difference between the gas introduction zone 1c and the fluidized bed zone 1b, and is shown in Tables 1 and 2 together with its ratio (u/u0) to the average velocity u0 in the fluidized bed zone 1b.

TABLE 1

| Experiment | 1 | 2 | 3 | 4 | 5 | 6 | 7 |
| --- | --- | --- | --- | --- | --- | --- | --- |
| (Gas passage hole) | | | | | | | |
| Shape | flaring | flaring | flaring | flaring | flaring | flaring | flaring |
| Numerical aperture | 4.5% | 4.5% | 4.5% | 4.5% | 4.5% | 4.5% | 4.5% |
| Broadening angle θ | 150° | 120° | 90° | 120° | 120° | 120° | 120° |
| Distance $d_1$ among hole | 8 mm | 8 mm | 8 mm | 8 mm | 8 mm | 8 mm | 8 mm |
| Diameter $d_2$ (B) | 10 mm | 10 mm | 10 mm | 10 mm | 10 mm | 10 mm | 10 mm |
| Diameter $d_2$ (A) (Overcap) | 14 mm | 14 mm | 14 mm | 14 mm | 14 mm | 14 mm | 12 mm |
| With or without overcap | with | with | with | with | with | with | with |
| Shape of outer line | FIG. 10 | FIG. 10 | FIG. 10 | FIG. 10 | FIG. 10 | FIG. 10 | FIG. 10 |
| Length (a) of horizontal portion | 15 mm | 15 mm | 15 mm | 5 mm | 25 mm | 15 mm | 15 mm |
| Angle φ of upper end | 45° | 45° | 45° | 45° | 45° | 60° | 45° |
| With or without partitioning wall | with | with | with | with | with | with | with |
| Shape of partitioning wall | FIG. 11 | FIG. 11 | FIG. 11 | FIG. 11 | FIG. 11 | FIG. 11 | FIG. 11 |
| (Velocity of gas flow) | | | | | | | |
| Velocity along the outer periphery u(cm/s) | 2610 | 2610 | 2610 | 2610 | 2610 | 2610 | 2240 |
| Velocity ratio (u/u₀) | 43.5 | 43.5 | 43.5 | 43.5 | 43.5 | 43.5 | 32 | note:
Diameter $d_2$ (A) represents the diameter $d_2$ of the hole of the inner peripheral portion A.
Diameter $d_2$ (B) represents the diameter $d_2$ of the hole of the outer peripheral portion B.

TABLE 2

| Experiment | 8 | 9 | 10 | 11 | 12 |
| --- | --- | --- | --- | --- | --- |
| (Gas passage hole) | | | | | |
| Shape | straight | flaring | flaring | flaring | flaring |
| Numerical aperture | 4.5% | 4.5% | 4.5% | 4.5% | 4.5% |
| Broadening angle θ | — | 120° | 120° | 120° | 120° |
| Distance $d_1$ among hole | 50 mm | 8 mm | 8 mm | 8 mm | 8 mm |
| Diameter $d_2$ (B) | 10 mm | 10 mm | 10 mm | 10 mm | 10 mm |
| Diameter $d_2$ (A) (Overcap) | 14 mm | 14 mm | 14 mm | 14 mm | 10 mm |
| With or without overcap | with | with | with | with | with |
| Shape of outer line | FIG. 10 | FIG. 9 | FIG. 10 | FIG. 10 | FIG. 10 |
| Length (a) of horizontal portion | 15 mm | 0 mm | 15 mm | 15 mm | 15 mm |
| Angle φ of upper end | 45° | 45° | 70° | 45° | 45° |
| With or without partitioning wall | with | with | with | without | with |
| Shape of partitioning wall | FIG. 11 | FIG. 11 | FIG. 11 | — | FIG. 11 |
| (Velocity of gas flow) | | | | | |
| Velocity along the outer periphery u(cm/s) | 2610 | 2610 | 2610 | 2610 | 1330 |
| Velocity ratio (u/u₀) | 43.5 | 43.5 | 43.5 | 43.5 | 19.0 | note:
Diameter $d_2$ (A) represents the diameter $d_2$ of the hole of the inner peripheral portion A.
Diameter $d_2$ (B) represents the diameter $d_2$ of the hole of the outer peripheral portion B.

(Results)

Experiment 1

After the operation was continued for five days, the interior of the polymerization vessel was observed. Though the layer of a polymer which is as thin as about 1 to 2 mm was formed on the wall surfaces of gas passage holes in the gas distributor plate, the operation could be conducted favorably and for extended periods of time. No drift of polymer was formed near the straight drum portion of the polymerization vessel.

Experiment 2

The operation could be continued favorably, and no polymer adhered on the wall surfaces of gas passage holes even after 7 days have passed. The operation could be conducted for further extended periods of time.

Experiment 3

The operation could be continued favorably, and no polymer adhered on the wall surfaces of gas passage holes even after 7 days have passed. The operation could be conducted for further extended periods of time.

Experiment 4

After the continuous operation for 6 days, the polymer layer of a thickness of about 5 mm was formed on the surface of the gas distributor plate on the outlet side of the overcaps. However, the gas passages had been maintained, no polymer adhered on the wall surfaces of the gas passage holes, and the operation could be continued for further extended periods of time.

Experiment 5

Even after the continuous operation for 8 days, no polymer adhered on the surface of the gas distributor plate on the outlet side of the overcaps and no polymer adhered on the wall surfaces of the gas passage holes, either. The operation could be continued for further extended periods of time.

Experiment 6

After the continuous operation for 5 days, the polymer layer of a thickness of about 2 to 3 mm was formed on the surface of the gas distributor plate on the outlet side of the overcaps. However, the gas passages had been maintained, no polymer adhered on the wall surfaces of the gas passage holes, and the operation could be continued for further extended periods of time.

Experiment 7

After the continuous operation for 5 days, the polymer layer of a thickness of about 10 mm was formed on the wall surfaces of the polymerization vessel. However, no polymer adhered on the wall surfaces of the gas passage holes, and the operation could be continued for two weeks.

Experiment 8

After the continuous operation for 7 days, about 40% of the gas passage holes had been plugged, the layer of polymer of 5 to 10 mm thick was formed on the lower surface of the gas distributor plate, and the operation could not be conducted any longer.

Experiment 9

After the continuous operation 10 days, the outlets of about 20% of the overcaps had been plugged, and masses like as chumps had been formed. The operation was finally abandoned after 17 days.

Experiment 10

After the continuous operation for 10 days, the outlets of about 30% of the overcaps had been plugged, and masses like as champs had been formed. The operation was finally abandoned after 14 days.

Experiment 11

After the continuous operation for 14 days, about 15% of the overcaps had been plugged, and the operation was finally abandoned after about 20 days.

Experiment 12

After the continuous operation for 4 days, the layer of polymer of 30 to 50 mm thick was formed on the wall surfaces of the polymerization vessel. Even the lines for taking out the powder had been plugged, and the operation could not be conducted any longer.

(Experiments 13 to 17)

By using a fluidized bed polymerization vessel equipped with a gas distributor plate having gas passage holes and overcaps shown in Table 3, ethylene and a small amount of butene-1 were subjected to the gas phase polymerization under the following conditions to prepare a linear low-density polyethylene having a density of 0.920 kg/m$^3$ and an MI of 4.0 g/10 min.

Superficial gas velocity in a column: 70 cm/sec
Polymerization pressure: 20 kg/cm$^2$ G
Polymerization temperature: 70° C.
Residence time: two hours In conducting the above-mentioned gas phase polymerization, continuous operation in the polymerization vessel was evaluated in the same manner as in Experiments 1 to 12. The results were as described below.

TABLE 3

| Experiment | 13 | 14 | 15 | 16 | 17 |
|---|---|---|---|---|---|
| (Gas passage hole) | | | | | |
| Shape | flaring | flaring | flaring | straight | flaring |
| Numerical aperture | 4.5% | 4.5% | 4.5% | 4.5% | 6% |
| Broadening angle θ | 120° | 120° | 120° | — | 120° |
| Distance d$_1$ among hole | 12 mm | 12 mm | 8 mm | 50 mm | 12 mm |
| Diameter d$_2$ (B) | 16 mm | 16 mm | 10 mm | 10 mm | 16 mm |
| Diameter d$_2$ (A) | 22 mm | 18 mm | 45 mm | 14 mm | 16 mm |
| (Overcap) | | | | | |
| With or without overcap | with | with | with | with | with |
| Shape of outer line | FIG. 10 | FIG. 10 | FIG. 10 | FIG. 10 | FIG. 10 |
| Length (a) of horizontal portion | 15 mm | 15 mm | 15 mm | 15 mm | 15 mm |
| Angle φ of upper end | 45° | 45° | 45° | 45° | 45° |
| With or without partitioning wall | with | with | with | with | with |
| Shape of partitioning wall | FIG. 11 | FIG. 11 | FIG. 11 | FIG. 11 | FIG. 11 |
| (Velocity of gas flow) | | | | | |
| Velocity along the outer periphery u(cm/s) | 2850 | 1750 | 6500 | 2610 | 1170 |
| Velocity ratio (u/u$_0$) | 41.0 | 25 | 93 | 43.5 | 16.7 | note:
Diameter d$_2$ (A) represents the diameter d$_2$ of the hole of the inner peripheral portion A.
Diameter d$_2$ (B) represents the diameter d$_2$ of the hole of the outer peripheral portion B.

(Results)

Experiment 13

Even after the continuous operation for 7 days, no polymer adhered on the surface of the gas distributor plate on the outlet side of the overcaps and no polymer adhered on the wall surfaces of the gas passage holes, either. The operation could be continued for further extended periods of time.

Experiment 14

After the continuous operation for 4 days, small masses like as chips were found in the powder taken out from the powder take-out line, but the operation could be continued for not shorter than a week.

Experiment 15

After the continuous operation 3 days, slightly massive polymer like as chips was formed on the peripheral upper surfaces of the gas distributor plate, but the operation could be continued for 5 days.

Experiment 16

After the continuous operation for 2 days, about 35% of the gas passage holes were plugged, a massive polymer like as chumps was formed on the gas distributor plate, and the operation was abandoned for two days.

Experiment 17

Sheet-like polymer was formed in many places, the line for taking out the powder was plugged after two days, and the operation could not be continued.

(Experiments 18 to 20)

By using a fluidized bed polymerization vessel equipped with a gas distributor plate having gas passage holes and overcaps shown in Table 4, the gas phase polymerization was carried out in the same manner as in Experiments 1 to 2 to prepare a polypropoylene.

In conducting the above-mentioned gas phase polymerization, continuous operation in the polymerization vessel was evaluated, and adhesion of polymer inside the polymerization vessel and on the gas distributor plate was observed. The results were as described below.

TABLE 4

|  | Experiment | | |
| --- | --- | --- | --- |
|  | 18 | 19 | 20 |
| (Gas passage hole) | | | |
| Numerical aperture | flaring | flaring | flaring |
| Broadening angle θ | 4.5% | 4.5% | 4.5% |
| Distance $d_1$ among holes | 150° | 120° | 90° |
| Diameter $d_2$ (B) | 8 mm | 8 mm | 8 mm |
| Diameter $d_2$ (A) (Overcap) | 10 mm | 10 mm | 10 mm |
| With or without overcap | with | with | with |
| Shape of outer line | FIG. 9 | FIG. 9 | FIG. 9 |
| Length (a) of horizontal portion | 0 mm | 0 mm | 0 mm |
| Angle φ of upper end | 45° | 45° | 45° |
| With or without partitioning wall | without | without | without |
| Shape of partitioning wall | — | — | — | note:
Diameter $d_2$ (A) represents the diameter $d_2$ of the hole of the inner peripheral portion A.
Diameter $d_2$ (B) represents the diameter $d_2$ of the hole of the outer peripheral portion B.

(Results)

Experiment 18

After the operation was continued for 5 days, the interior of the polymerization vessel was observed. The layer of a polymer which is as thin as about 1 to 2 mm was formed on the wall surfaces of gas passage holes in the gas distributor plate, and a drift of polymer was formed to a small extent near the straight drum portion of the polymerization vessel. However, the operation could be favorably conducted for extended periods of time.

Experiment 19

The operation could be continued favorably. After 7 days of operation, a drift of polymer developed to a slight degree in the straight drum portion of the polymerization vessel near the upper side of the distributor plate. However, no polymer was formed on the wall surfaces of gas passage holes, and the operation could be continued for extended periods of time.

Experiment 20

The operation could be continued favorably. After 5 days of operation, a drift of polymer developed to a slight degree in the straight drum portion of the polymerization vessel near the upper side of the distributor plate. However, no polymer was formed on the wall surfaces of gas passage holes, and the operation could be continued for extended periods of time.

By using the gas distributor plate of the present invention in which the gas passage holes formed in the outer peripheral portion have an average diameter which is larger than that of the gas passage holes formed in the inner peripheral portion, it is allowed to uniformly and stably diffuse the gas flow in the fluidized bed zone in the polymerization vessel, to effectively prevent the formation of dead zone, and to effectively prevent the polymer from adhering onto the wall surfaces of the polymerization vessel.

Moreover, the gas passage holes are formed in a downwardly flaring shape, the flaring angle being set to be 60° to 150° in order to effectively prevent the polymer from adhering on the wall surfaces of gas passage holes.

By providing the overcaps so as to cover the upper side of the gas passage holes permitting the gas to flow out in one direction only, the polymer particles falling from the fluidized bed zone are effectively prevented from entering into the gas passage holes which are then effectively prevented from being plugged. By forming a horizontal portion at the upper end of the outer line of the cap as viewed on a vertical cross section, furthermore, it is allowed to effectively prevent the occurrence of plugging in the caps. In the overcaps a partitioning wall is provided along the upper edge of the gas passage holes and space formed between the upper edge of the gas passage holes and the cap wall surfaces is shut off from the gas flow, in order to further effectively prevent the plugging in the caps.

According to the present invention which uses the above-mentioned gas distributor plate, it is made possible to stably and continuously carry out the operation in the fluidized bed polymerization vessel for extended periods of time in order to efficiently gas-phase polymerize olefins.

We claim:

1. A gas distributor plate having a number of gas passage perforated holes which is provided in a fluidized bed polymerization vessel for gas phase polymerization of olefins and is mounted inside a straight drum portion of the polymerization vessel, said polymerization vessel having an inner radius of the straight drum portion of the polymerization vessel denoted by 1, the gas distributor plate having holes perforated in a peripheral portion of the distributor plate at 0.7 to 1.0 from the center of the drum portion have an average diameter which is larger than the average diameter of the holes perforated in an inner portion of the distributor plate at smaller than 0.7 from said center, and a gap $d_1$ between the neighboring holes at the lower ends of said plate and a diameter $d_2$ of the holes at the upper end of said plate satisfying a relationship $d_1<d_2$.

2. A gas distributor plate according to claim 1, wherein the average diameter of the holes formed in said peripheral portion is so set that an average linear velocity of gas passing through the holes in said portion is 20 to 100 times as large as the linear velocity of gas in the fluidized bed zone on upstream side of the gas distributor plate.

3. A gas distributor plate according to claim 2, wherein the average diameter of the holes formed in said peripheral portion is from 1.1 to 15 times as large as the average diameter of the holes formed in said inner portion.

4. A gas distributor plate according to claim 1, wherein the holes are formed in a downwardly flaring shape, and the average diameter at the upper edge of the holes formed in the peripheral portion is larger than the average diameter at the upper edge of the holes formed in the inner portion.

5. A gas distributor plate according to claim 4, wherein said holes are formed in a conically flaring shape having a flaring angle θ of from 60° to 150°.

6. A gas distributor plate according to claim 5, wherein said flaring angle θ is from 90° to 120°.

7. A gas distributor plate according to any one of claims 4 to 6, wherein a gap $d_1$ between the neighboring holes at the lower ends thereof and a diameter $d_2$ of the holes at the upper end thereof satisfy a relationship $d_1<d_2$.

8. A gas distributor plate according to claim 1, wherein an overcap is provided on the upper side of each hole, so that the gas flowing through the hole is drained in one direction along the upper surface of the gas distributor plate.

9. A gas distributor plate according to claim 8, wherein said overcap has an outer line which, as viewed on a vertical cross section, is inclined straight or in a streamlined shape upwardly from the root portion toward the hole.

10. A gas distributor plate according to claim 9, wherein said overcap has such an outer line that the upper end portion thereof is horizontally formed.

11. A gas distributor plate according to claim 10, wherein said horizontal portion has a length (a) which lies within a range of 3 mm≦a≦30 mm.

12. A gas distributor plate according to claim 10 or 11, wherein an angle φ subtended by a straight line connecting the upper edge of the hole on the side in which the gas flows out to the tip of the horizontal portion on the outer line of the gap is smaller than 60° as viewed on the vertical cross section.

13. A gas distributor plate according to claim 8, wherein a partitioning wall is provided rising from the upper edge of the hole and reaching the inner wall surface of the overcap in said overcap on the side opposite to the side where the gas flows out.

14. A gas distributor plate according to claim 13, wherein said partitioning wall is curved along the upper edge of the hole.

15. A gas distributor plate according to claim 14, wherein said partitioning wall is inclined along the inner wall surface of the overcap and is joined to the inner wall surface of the cap.

16. A gas distributor plate having a number of gas passage holes which is provided in a fluidized bed polymerization vessel for gas phase polymerization of olefins, wherein an overcap is so provided as to cover the upper side of each hole so that the gas flowing through said hole is drained in one direction, the outer line of the overcap as viewed in a vertical cross section upwardly rises in an inclined manner from the root portion thereof toward the side of the hole in a straight shape or in a streamlined shape, and the upper end thereof is formed horizontally and wherein a gas $d_1$ between the neighboring holes at the lower ends of the plate and a diameter $d_2$ of the holes at the upper ends thereof satisfy a relationship $d_1<d_2$.

17. A gas distributor plate according to claim 16, wherein said horizontal portion has (a) length a which lies within a range of 3 mm≦a≦30 mm.

18. A gas distributor plate having a number of gas passage holes which is provided in a fluidized bed polymerization vessel for gas phase polymerization of olefins, wherein an overcap is so provided as to cover the upper side of each hole so that the gas flowing through said hole is drained in one direction, the outer line of the overcap as viewed in a vertical cross section is upwardly inclined from the root portion thereof toward the hole in a straight shape or in a streamlined shape, and a partitioning wall is provided in the overcap on the side opposite to the side where the gas flows out, the partitioning wall rising from the upper edge of the hole and reaching the inner wall surface of the overcap and wherein a gap $d_1$ between the neighboring holes at the lower ends of the plate and a diameter $d_2$ of the holes at the upper ends thereof satisfy a relationship $d_1<d_2$.

* * * * *